May 15, 1928.
W. C. SMITH
FRAMING LIGHT FOR MOVING PICTURE MACHINES
Filed Sept. 25, 1920
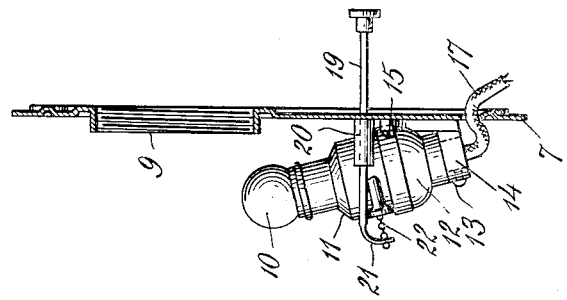
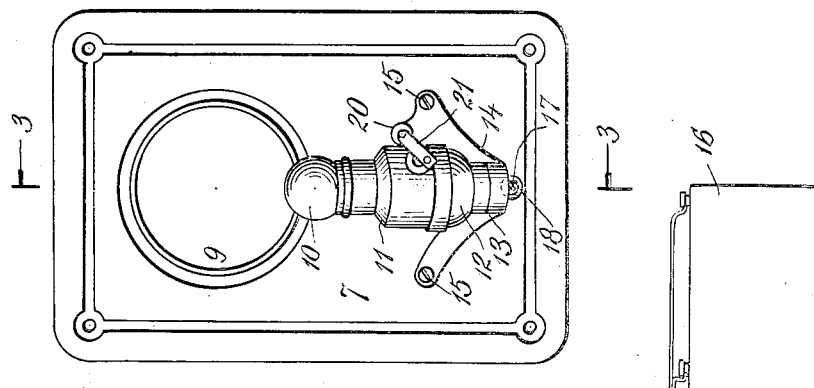
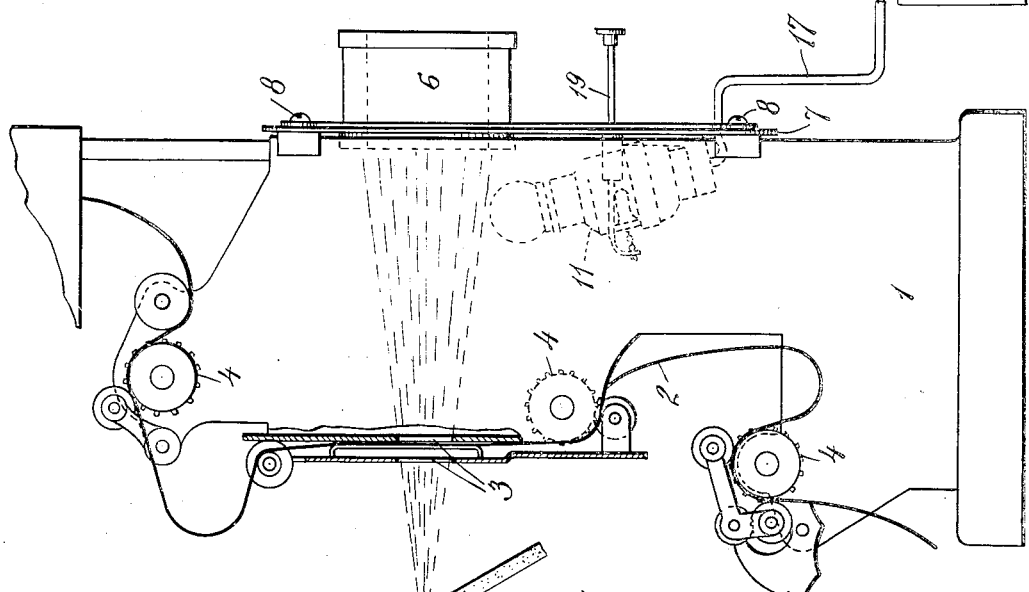
Will C. Smith Inventor
By his Attorneys
Pennie, Davis, Marvin & Edmonds Patented May 15, 1928.

1,669,427

UNITED STATES PATENT OFFICE.

WILL C. SMITH, OF NEW YORK, N. Y., ASSIGNOR TO NICHOLAS POWER COMPANY, INC., OF NEW YORK, N. Y., A CORPORATION OF DELAWARE.

FRAMING LIGHT FOR MOVING-PICTURE MACHINES.

Application filed September 25, 1920. Serial No. 412,715.

This application relates to improvements in motion picture projectors.

Due to danger from fire it is necessary that moving picture films be used in limited lengths, two thousand feet being the maximum length of film per reel that is commercially approved. At the present time picture plays of a single continuous subject frequently consist of from two to five times that length of film. The change from one reel to another must of necessity be smooth and quick. Not only is it necessary to start the second reel in operation immediately upon completion of the first, but previous to the starting of the second reel the picture should be properly "framed" on the screen to avoid the undesirable impression created by having a misplaced picture during the first few feet of the new reel.

This "framing" of the picture must be accomplished while the preceding reel is being shown in order that no discontinuity occur between reels. To accomplish this it is not feasible to switch on the projector arc because its rays are so intense as to set fire to the film in a few seconds when stationary. If, however, the film be illuminated from within the machine, it is possible for the operator to sight through the projector aperture and properly locate the film. At present, the operator is accustomed to reach around to the inside of the projector with one hand carrying a flashlight for illuminating the film, while at the same time he sights through the aperture and with his free hand accomplishes the adjustment of the film. In lieu of a flashlight he sometimes strikes a match and uses it for the same purpose. Such methods are exceedingly crude and awkward, to say nothing of the danger from fire incident upon holding a lighted match near the film. Also, the presence of light within the operator's cage is undesirable when a reel is being shown. Furthermore such proceedure occupies a considerable amount of the operator's time, thereby increasing the likelihood of delays.

One object of the present invention is to provide a satisfactory means for "framing" a picture in the machine, this being done in any easy and convenient manner that occupies a minimum amount of the operator's time.

A further object of the invention is to provide a device of this kind that sheds no light out into the cage and from which there is no danger of fire.

A still further object is to provide a device of this kind that is mounted conveniently in an accessible place, that does not interfere with the projecting rays, and that occupies space ordinarily unused and is consequently completely out of the way.

I have illustrated my invention in the accompanying drawings in which:

Fig. 1 is a side elevation, partly in section, of a motion picture projector equipped with my improvements;

Fig. 2 is a back view of the front plate of a projector embodying my improvements;

Fig. 3 is a view taken on line 3, 3 of Fig. 2, my improvement however, not being shown in section.

Referring to the figures, 1 is the frame of the projecting machine. A common arrangement is shown in which the film (2) is drawn past the projector aperture (3) by means of sprocket wheels (4). The light from the projector arc (5) passes through the aperture (3), through the lens tube (6), and from thence to the screen. The front plate (7) of the projector is fastened to the frame by means of screws (8) and is provided with a threaded opening (9) into which the lens tube is screwed. To this front plate (7) is secured a small electric lamp having a bulb (10) screwed into a socket (11), which socket is provided with a base (12). The lower portion of this base (12) is reduced as indicated at (13) to fit a hole in the bracket (14). The bracket (14) serves as a support for the lamp and is fastened securely to the plate (7) by means of screws (15). The lamp is supplied from a small cell (16) by means of the leads (17) which enter the projector through a small hole (18) in the plate (7). For the purpose of actuating the lamp from the exterior of the projector a pushrod (19) is fitted through the front plate by means of a guide (20) and arranged with a hook (21) at its end for the purpose of engaging a chain (22), which chain operates the switch in the lamp socket when the rod (19) is pushed in. The lamp is mounted on the front plate of the projector at such height that the top of the bulb lies just below the path of the light rays from the arc to the screen.

When the front plate is in place and the film has been started into the projector the light may be switched on by merely pushing the rod (19) and the "framing" of the picture quickly accomplished, after which the lamp may be switched off by another movement of the rod (19). The lamp is completely enclosed with the projector frame and consequently does not shed light out into the operator's cage where it is not desired.

I claim:

1. A picture projector comprising the combination of a projection light, film carrying mechanism in front of said light having a projection aperture associated therewith, a projecting mechanism casing having a wall disposed in front of said film carrying mechanism, a projection lens mounted in said wall, and an auxiliary light of less intensity than said projection light disposed between said film carrying mechanism and said wall so that the film and aperture may be viewed from behind said aperture for the purpose of framing the picture.

2. A picture projector comprising the combination of a projection light, film carrying mechanism in front of said light having a projection aperture associated therewith, a projecting mechanism casing having a wall disposed in front of said film carrying mechanism, a projection lens mounted in said wall, and an auxiliary light of less intensity than said projection light and mounted upon said wall in proximity to the path of the rays from the projection light, so that the film and aperture may be viewed from behind said aperture for the purpose of framing the picture.

3. A picture projector comprising the combination of a projection light, film carrying mechanism in front of said light having a projection aperture associated therewith, a projecting mechanism casing having a wall disposed in front of said film carrying mechanism, a removable plate mounted in said wall and having a projection lens secured thereto, and an auxiliary light of less intensity than the projection light mounted upon the rear face of said removable plate so as to permit the viewing of the film and aperture from behind the aperture for the purpose of framing the picture.

In testimony whereof I affix my signature.

WILL C. SMITH.